(12) United States Patent
Okahashi et al.

(10) Patent No.: US 6,985,251 B2
(45) Date of Patent: Jan. 10, 2006

(54) IMAGE PROCESSING APPARATUS AND METHOD FOR THE FAST AND ACCURATE CALIBRATION OF THE SAME USING ACTUAL AND PSEUDO REFERENCE IMAGE DATA

(75) Inventors: Yoshitaka Okahashi, Kashihara (JP); Nobuo Manabe, Yamatokoriyama (JP); Takao Horiuchi, Nara (JP); Kyosuke Taka, Nara (JP); Mitsuharu Yoshimoto, Kitakatsuragi-gun (JP); Hidekazu Sakagami, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 791 days.

(21) Appl. No.: 09/864,818

(22) Filed: May 24, 2001

(65) Prior Publication Data

US 2001/0052989 A1 Dec. 20, 2001

(30) Foreign Application Priority Data

May 25, 2000 (JP) ............................. 2000-155338

(51) Int. Cl.
*G06K 15/00* (2006.01)
(52) U.S. Cl. ....................................... 358/1.3; 358/401
(58) Field of Classification Search ................ 346/157; 355/326; 358/80, 300, 1.15, 401, 400, 1.3, 358/2.1, 1.9
See application file for complete search history.

(56) References Cited

U.S. PATENT DOCUMENTS 4,959,669 A * 9/1990 Haneda et al. ............... 347/115

FOREIGN PATENT DOCUMENTS

| JP | 2643951 | 5/1997 |
| JP | 2000-050072 | 2/2000 |

* cited by examiner

*Primary Examiner*—Jerome Grant, II
(74) *Attorney, Agent, or Firm*—Edwards & Angell, LLP; David Conlin; David Tucker

(57) ABSTRACT

The image forming apparatus includes: an image data input section for reading a document as image data; a target value memory section for storing a target value of an input/output characteristic value when a reference document is read; a comparator for comparing the image data of the reference document and the target value so as to create a new input/output characteristic value; a fixed value memory section for storing a difference in input/output characteristic values as a fixed value between an original document and a copy document; and an adder for adding the fixed value to the image data of the reference document so as to output a resultant value to the comparator. By the provision of the fixed value memory section and the adder, the image forming apparatus can set a plurality of input/output characteristic values by reading the reference document once, thus reducing time for the procedure of setting the respective input/output characteristic values.

10 Claims, 14 Drawing Sheets

FIG. 11

(R COMPONENT)

| PATCH No. | READ VALUE RXi | FIXED VALUE RCi | PREDICTED VALUE RX'i | TARGET VALUE RRi |
|---|---|---|---|---|
| BK1 | RX1 | RC1 | RX'1 | RR1 |
| BK2 | RX2 | RC2 | RX'2 | RR2 |
| BK3 | RX3 | RC3 | RX'3 | RR3 |
| BK4 | | | | |
| BK5 | | | | |
| BK6 | | | | |
| BK7 | | | | |
| BK8 | | | | |
| . | | | | |
| . | | | | |
| . | | | | |
| BK20 | | | | |
| BK21 | | | | |
| BK22 | | | | |
| BK23 | | | | |
| BK24 | | | | |

(G COMPONENT)

| PATCH No. | READ VALUE GXi | FIXED VALUE GCi | PREDICTED VALUE GX'i | TARGET VALUE GRi |
|---|---|---|---|---|
| BK1 | GX1 | GC1 | GX'1 | GR1 |
| BK2 | GX2 | GC2 | GX'2 | GR2 |
| BK3 | GX3 | GC3 | GX'3 | GR3 |
| BK4 | | | | |
| BK5 | | | | |
| BK6 | | | | |
| BK7 | | | | |
| BK8 | | | | |
| . | | | | |
| BK20 | | | | |
| BK21 | | | | |
| BK22 | | | | |
| BK23 | | | | |
| BK24 | | | | |

(B COMPONENT)

| PATCH No. | READ VALUE BXi | FIXED VALUE BCi | PREDICTED VALUE BX'i | TARGET VALUE BRi |
|---|---|---|---|---|
| BK1 | BX1 | BC1 | BX'1 | BR1 |
| BK2 | BX2 | BC2 | BX'2 | BR2 |
| BK3 | BX3 | BC3 | BX'3 | BR3 |
| BK4 | BX4 | BC4 | BX'4 | BR4 |
| BK5 | BX5 | BC5 | BX'5 | BR5 |
| BK6 | BX6 | BC6 | BX'6 | BR6 |
| BK7 | BX7 | BC7 | BX'7 | BR7 |
| BK8 | BX8 | BC8 | BX'8 | BR8 |
| . | . | . | . | . |
| . | . | . | . | . |
| . | . | . | . | . |
| BK20 | BX20 | BC20 | BX'20 | BR20 |
| BK21 | BX21 | BC21 | BX'21 | BR21 |
| BK22 | BX22 | BC22 | BX'22 | BR22 |
| BK23 | BX23 | BC23 | BX'23 | BR23 |
| BK24 | BX24 | BC24 | BX'24 | BR24 |

F I G. 1 2
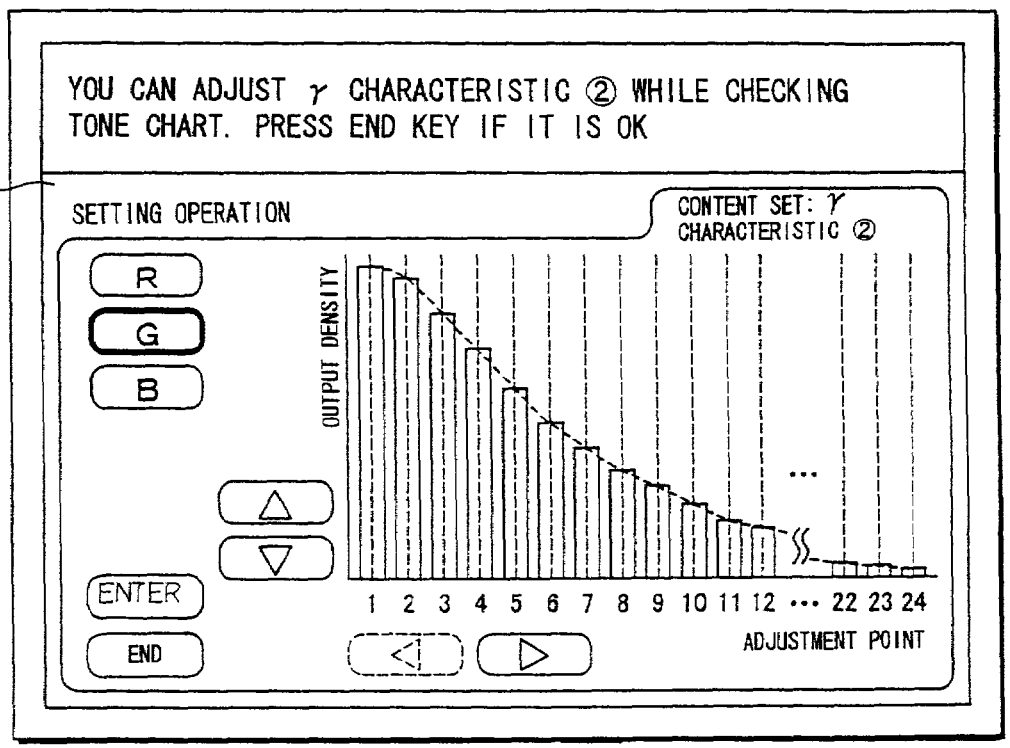

IMAGE PROCESSING APPARATUS AND METHOD FOR THE FAST AND ACCURATE CALIBRATION OF THE SAME USING ACTUAL AND PSEUDO REFERENCE IMAGE DATA

FIELD OF THE INVENTION

The present invention relates to an image forming apparatus with a plurality of image forming modes, such as a plurality of color processing modes, and to an image processing method of such an image forming apparatus.

BACKGROUND OF THE INVENTION

In recent years, color copying apparatuses, which are one form of image forming apparatuses, are adapted to create a color image by converting a document, which was scanned by a solid-state imaging device of an image reading section, into image information in the form of an electrical signal, and by inputting the electrical signal into a color image forming section. The solid-state imaging device usually employs a color CCD sensor of a structure in which color filters of R, G, B (red, green, blue) are placed on a light-receiving area of the color CCD section.

The electrical signal of the image information which was obtained by scanning the document is subjected to an image process, before it is outputted from a color image processing section, to create an image in conformity with the document. That is, the image processing for controlling the electrical signal of the image information is performed to form a conform image according to input/output characteristic values of input/output means of the image reading section including the solid-state imaging device, or the color image forming section.

The input/output characteristic values of the input/output means differ depending on such factors as components making up the apparatus or a control method, and there is need to set the input/output characteristic values for each individual apparatus. This is commonly carried out by (1) a method in which a reference document is read by the image reading section to set the input/output characteristic values, and (2) a method in which an image created by the color image forming section based on an electrical signal of the image information which was obtained from the image reading section is outputted therefrom, and the output image is read again by the image reading section to set the input/output characteristic values.

However, the problem of such a conventional image forming apparatus is that it takes effort to set the input/output characteristic values. Namely, the image forming apparatus includes a number of image forming modes for different kinds of documents, such as a document including ordinary characters, a document including dot images, and a document including photographic images. This necessitated the conventional method of setting the input/output characteristic values to use different reference documents for different image forming modes and to set the input/output characteristic values individually for each reference document, thus posing the problem of troublesome setting of the input/output characteristic values.

Therefore, there are conventional problems that it takes time to set the input/output characteristic values because they are set for the number of times which corresponds to the number of image forming modes, and that, in the event where the reference document was different for each image forming mode, there were cases where a different reference document was used erroneously, which necessitated re-setting and also resulted in a prolonged operation time for setting the input/output characteristic values.

SUMMARY OF THE INVENTION

The present invention was made in view of the foregoing problems and it is an object of the present invention to provide an image forming apparatus and an image processing method thereof, which allow a plurality of input/output characteristic values to be set by simply reading a reference document once, so as to reduce operation time for setting the input/output characteristic values, and to prevent erroneous setting of the input/output characteristic values.

In order to achieve this object, an image forming apparatus of the present invention for forming an image in a plurality of image forming modes includes an image reading section for reading a document; an image forming section for forming an image based on image data of the document read; and first setting means for setting respective input/output characteristic values corresponding to the plurality of image forming modes based on reference image data generated by reading a reference document having a tone pattern formed thereon.

This arrangement allows the respective input/output characteristic values corresponding to the plurality of image forming modes to be simultaneously set by reading the reference document once, without a procedure of setting the input/output characteristic values for a number of times which correspond to the plurality of image forming modes, thus greatly reducing time for the procedure of setting the respective input/output characteristic values, in addition to reducing adjustment cost.

In order to achieve the foregoing object, an image processing method of an image forming apparatus of the present invention, which is for an image forming apparatus for forming an image in a plurality of image forming modes and having input/output characteristic values respectively corresponding to the plurality of image forming modes, comprises the steps of: reading a reference document having a tone pattern formed thereon, as reference image data; setting a first input/output characteristic value, which corresponds to the first image forming mode, from a pre-set target value for setting an input/output characteristic value and from the reference image data; and creating pseudo image data from the image data using a fixed value which corresponds to a difference in the respective input/output characteristic values, so as to set a second input/output characteristic value, which corresponds to a second image forming mode, from the pseudo image data and the pre-set target value.

According to this method, the pseudo image data, which corresponds to the second image forming mode, is created from the image data which corresponds to the first image forming mode. This allows the respective input/output characteristic values corresponding to the plurality of image forming modes to be simultaneously set by single reading of the reference document, without performing the procedure of setting the input/output characteristic values for a number of times which correspond to the number of the plurality of image forming modes, thus greatly reducing time for the setting procedure of the input/output characteristic values, in addition to reducing adjustment cost.

For a fuller understanding of the nature and advantages of the invention, reference should be made to the ensuing detailed description taken in conjunction with the accompanying drawings.

BRIEF DESCRIPTION OF THE DRAWINGS

FIG. 11 is an explanatory drawing showing data of each color from the reference document in the image processing method of the image forming apparatus.

FIG. 12 is an explanatory drawing showing an example of a display screen for changing γ characteristic ② on the color LCD.

DESCRIPTION OF THE EMBODIMENTS

The following will describe one embodiment of the present invention with reference to FIG. 1 through FIG. 14.

Figure 2:
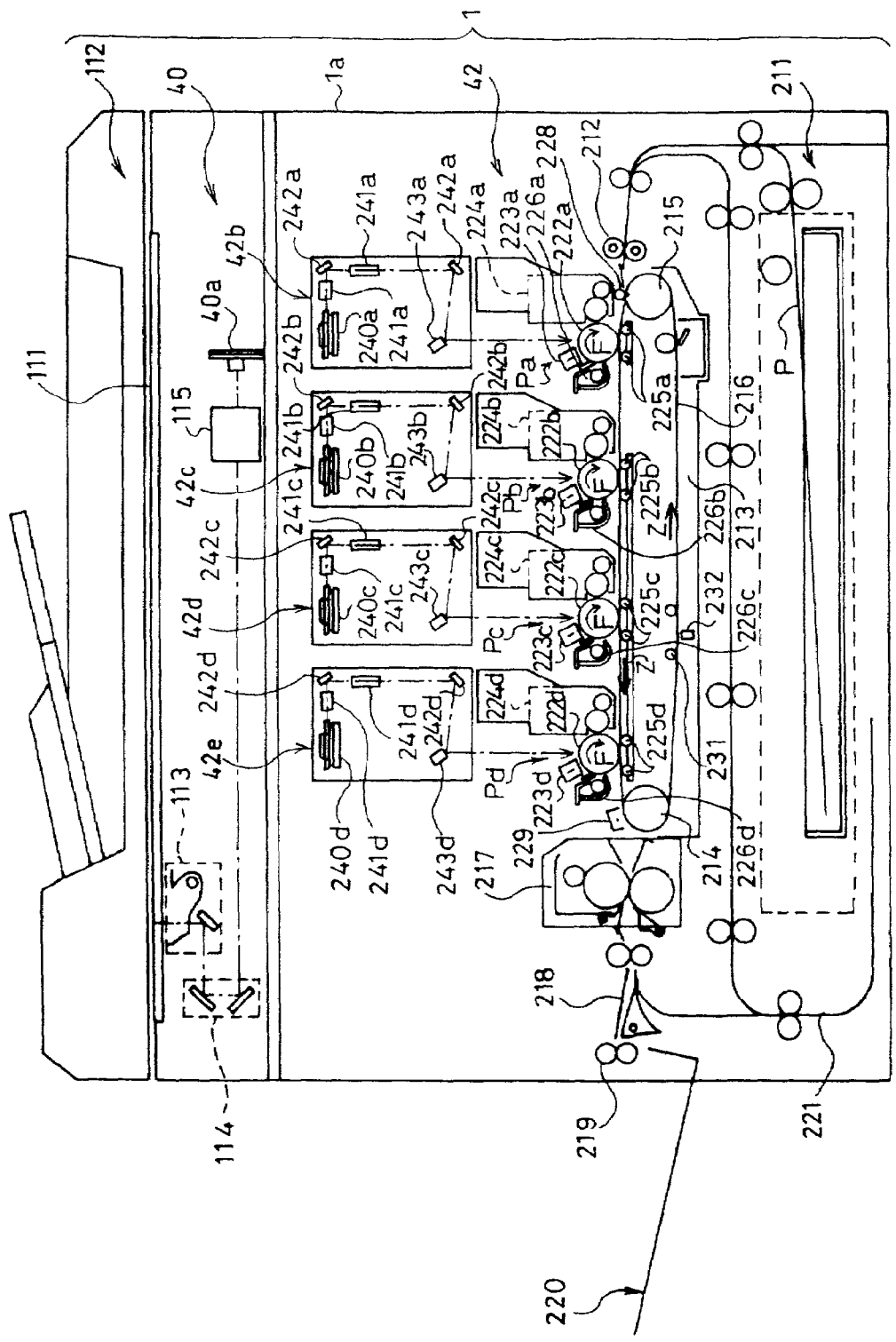
FIG. 2 is a cross sectional view schematically showing the image forming apparatus.

As shown in FIG. 2, a digital color copying machine 1, which is one embodiment in accordance with an image forming apparatus of the present invention, includes a document table 111 of a light transmissive nature and an operation panel on an upper part of a copying machine main body 1a of a box shape, and an image data input section (image reading section) 40 and an image data output section (image forming section) 42 inside the copying machine main body 1a. The image data input section 40 creates document image information in the form of an electrical signal from a document placed on the document table 111. The image data output section 42 creates a copy according to a document image from the document image information.

On an upper surface of the document table 111 is mounted an RADF (recirculating automatic document feeder) 112, which is supported in such a manner that it can be opened or closed with respect to the document table 111, and in a predetermined positional relation with respect to the plane of the document table 111.

The RADF 112 transports a document so that one side of the document faces the image data input section 40 on a predetermined position of the document table 111, and after an image has been read out from this side of the document, transports the document to the document table 111 by reversing the document so that the other side of the document faces the image data input section 40 on a predetermined position of the document table 111.

The RADF 112, after images on the both sides of the document have been read out, then releases the document, so as to perform the recirculating feeding operation with respect to incoming another sheet.

The foregoing operations of document transport and document reversal are controlled in relation to the entire operation of the digital color copying machine 1. The image data input section 40 is placed beneath the document table 111 so as to read the image of a document which was transported and placed on the document table 111 by the RADF 112.

The image data input section 40, in order to read a document by scanning, includes first and second scanning units 113 and 114 which move back and forth along and parallel to the lower surface of the document table 111 to guide reflected light from the document, an optical lens 115 for converging light from the first and second scanning units 113 and 114, and a color CCD 40a, which is a photoelectric converting element for converting light from the optical lens 115 into an electrical signal.

The first scanning unit 113 includes an exposure lamp for exposing a surface of a document image, and a first mirror which deflects a reflected image from the document in a predetermined direction, and the first scanning unit 113 moves at a predetermined scanning speed back and forth parallel to and with a constant distance from the lower surface of the document table 111.

The second scanning unit 114 includes second and third mirrors which further deflect the reflected image of the document, which was deflected by the first mirror of the first scanning unit 113, in a predetermined direction, and the second scanning unit 114 moves back and forth parallel to and at a constant speed relative to the first scanning unit 113.

The optical lens 115 reduces the reflected image size of the document deflected by the third mirror of the second scanning unit 114, and focuses the reduced optic image on a predetermined position on the color CCD 40a.

The color CCD 40a performs photoelectric conversion of the focused optic image one after another and outputs it as an electrical signal. The color CCD 40a is a three-line color CCD sensor, capable of reading a monochromatic image or a color image and outputting line data of separated color components of R (red), G (green), and B (blue). The document image information which was converted into an electrical signal by the color CCD 40a is transferred to an image processing section (not shown) to be subjected to a predetermined image data process therein.

The following describes a structure of the image data output section 42 and structures of components associated with the image data output section 42. On a lower part of the image data output section 42 is provided a feeding mechanism 211 for separating and supplying sheets (recording medium) P of paper, which are stacked and stored in a sheet tray, to the image data output section 42.

The separated sheet P thus supplied is then transported to the image data output section 42 at a controlled timing by a pair of resist rollers 212 which are disposed at a near part of the image data output section 42 in the feeding mechanism 211. When forming images on the both sides of the sheet P, the sheet P having an image formed on one side is supplied again to the image data output section 42 at the timing of image formation by the image data output section 42.

Beneath the image data output section 42 and above the feeding mechanism 211, a transfer conveyer belt mechanism 213 is disposed. The transfer conveyer belt mechanism 213 is structured such that the sheet P is transported by being electrostatically stuck on a transfer conveyer belt 216 which is a caterpillar substantially in parallel between a driving roller 214 and a follower roller 215.

On the downstream side of the transfer conveyer belt mechanism 213 in the sheet transport path is disposed a fixing device 217 for fixing a transferred toner image on the sheet P. The sheet P having passed a nip portion between a pair of fixing rollers in the fixing section 217 is released by releasing rollers 219, via a transport direction switching gate 218, on a release tray 220 which is fastened on an outer wall of the copying machine main body 1a.

The switching gate 218 is provided to selectively switch transport paths of the fixed sheet P, between a path for releasing the sheet P out of the copying machine main body 1a, and a path for re-supplying the sheet P to the image data output section 42. The sheet P in the switched transport path by the switching gate 218 to the image data output section 42 is re-supplied to the image data output section 42 after being reversed the sides via a switch-back transport path 221.

Above the transfer conveyer belt 216 in the image data output section 42, there are provided, in the vicinity of the transfer conveyer belt 216, a first image forming station Pa, a second image forming station Pb, a third image forming station Pc, and a fourth image forming station Pd, side by side in this order from the upstream side of the sheet transport path.

The transfer conveyer belt 216 is driven by friction by the driving roller 214 in a direction of arrow Z (counterclockwise direction) in FIG. 2, so as to transport the sheet P, which was supplied from the feeding mechanism 211, successively to the first through fourth image forming stations Pa through Pd by holding the sheet P by electrostatic adhesion.

The image forming stations Pa through Pd have analogous structures. The image forming stations Pa through Pd have photoreceptor drums 222a, 222b, 222c, and 222d, respectively, which are driven to rotate in a direction of arrow F in FIG. 2. surrounding the photoreceptor drums 222a, 222b, 222c, and 222d are, along their direction of rotation, chargers 223a, 223b, 223c, and 223d for uniformly charging the corresponding photoreceptor drums 222a, 222b, 222c, and 222d; developing devices 224a, 224b, 224c, and 224d for developing electrostatic latent images formed on their corresponding photoreceptor drums 222a, 222b, 222c, and 222d; transfer dischargers 225a, 225b, 225c, and 225d for transferring the developed toner images of the corresponding photoreceptor drums 222a, 222b, 222c, and 222d onto the sheet P; and cleaning devices 226a, 226b, 226c, and 226d for removing residual toner on the corresponding photoreceptor drums 222a, 222b, 222c, and 222d.

Further, above the photoreceptor drums 222a, 222b, 222c, and 222d are provided laser beam scanners 42b, 42c, 42d, and 42e, respectively.

The laser beam scanners 42b to 42e include semiconductor laser elements (not shown) for emitting dot light which is modulated according to the document image information (image data); polygon mirrors (deflecting devices) 240a through 240d for deflecting laser beams from the semiconductor laser elements in a main scanning direction; and fθ lenses 241a through 241d, mirrors 242a through 242d, and mirrors 243a through 243d for focusing respective deflected laser beams off the polygon mirrors 240a through 240d onto the surfaces of the photoreceptor drums 222a through 222d, respectively.

To the laser beam scanner 42b is inputted a pixel signal which corresponds to a black component image of color document image information. To the laser beam scanner 42c is inputted a pixel signal which corresponds to a cyan component image of the color document image information. To the laser beam scanner 42d is inputted a pixel signal which corresponds to a magenta component image of the color document image information. To the laser beam scanner 42e is inputted a pixel signal which corresponds to an yellow component image of the color document image information.

Thus, the photoreceptor drums 222a through 222d come to have their respective electrostatic latent images which correspond to the color-converted document image information. The developing devices 224a through 224d store toners of black, cyan, magenta, and yellow, respectively. The electrostatic images on the photoreceptor drums 222a through 222d are developed by the toners of these colors, respectively.

As a result, the document image information which was color-converted in the image data output section 42 is reproduced as the toner images of respective colors. Further, between the first image forming station Pa and the feeding mechanism 211 is provided a sheet adhering (brush) charger 228. The sheet adhering charger 228 is provided to charge the surface of the transfer conveyer belt 216. The sheet P supplied from the feeder mechanism 211 is transported to the first to fourth image forming stations Pa through Pd while ensuring secure adhesion on the transfer conveyer belt 216 to prevent position change.

Meanwhile, a discharger 229 is provided between the fourth image forming station Pd and the fixing device 217 and almost directly above the driving roller 214. An alternating current is applied to the discharger 229 to separate the electrostatically adhering sheet P on the transfer conveyer belt 216 therefrom.

The sheet P used in the digital color copying machine 1 having the foregoing arrangement is paper in the form of a cut sheet. When the sheet P is sent out from a feeder cassette and supplied to a guide in the sheet transport path of the feeder mechanism 211, a sensor (not shown) detects a leading end of the sheet P, and the sheet P is stopped temporarily by the pair of resist rollers 212 based on a detection signal which the sensor outputs.

The sheet P is then sent to the transfer conveyer belt 216 rotating in a direction of arrow Z in FIG. 2, at the timings of the image forming stations Pa through Pd. Here, since the transfer conveyer belt 216 is charged to a predetermined level by the sheet adhering charger 228 as described above, the sheet P on the transfer conveyer belt 216 can be stably transported and supplied through the image forming stations Pa through Pd.

At the image forming stations Pa through Pd, toner images of respective colors are formed and overlaid on the surface of the sheet P being transported on the transfer conveyer roller 216 by electrostatic adhesion. Finished with image transfer at the fourth image forming station Pd, the sheet P is removed from the transfer conveyer belt 216 by the discharger 229 from its leading end, and guided to the fixing device 217. Finally, the sheet P with the fixed toner image is released onto the release tray 220 from a sheet releasing opening (not shown).

Note that, the foregoing explained the case where application of light on the photoreceptors 222a through 222d are carried out by exposure, by scanning laser beams from the laser beam scanners 42a through 42e. However, instead of the laser beams, an optical system (LED head) made up of a light-emitting diode array and a focusing lens array may be used. The LED head is smaller in size than the laser beam scanner, and is silent since it has no moving parts. This makes the LED head particularly suitable for an image forming apparatus such as a digital color copying machine 1 of a tandem type which requires a plurality of light applying units.

Figure 3:
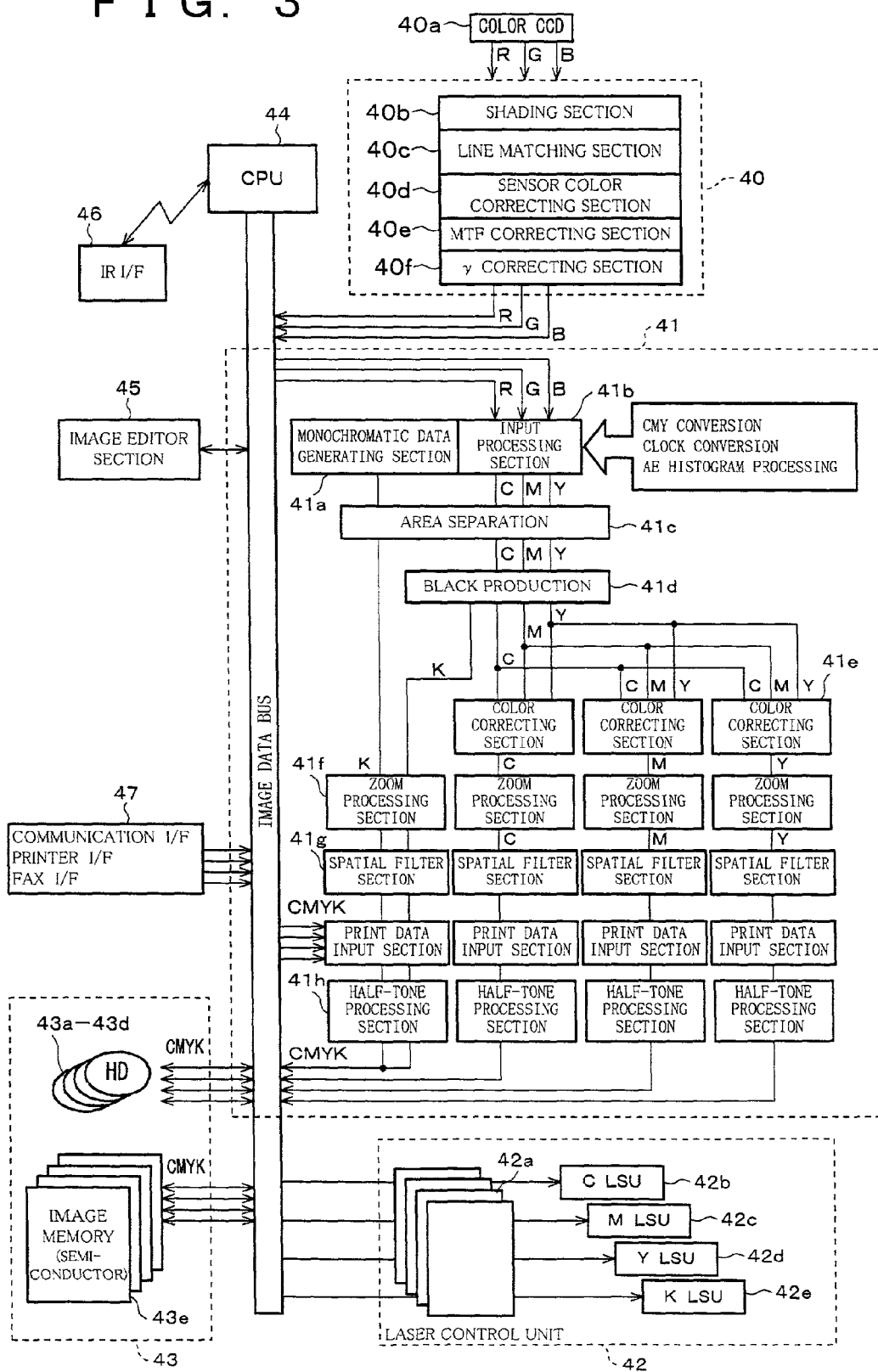
FIG. 3 is a block diagram schematically showing the entire image forming apparatus.

The following explains a structure and functions of an image processing unit of color image information, which is installed in the digital color copying machine 1. The image processing unit of the digital color copying machine 1 includes, for example, as shown in FIG. 3, the image data input section 40, an image processing section 41, the image data output section 42, an image memory 43 made up of a hard disk device or a RAM (random access memory), etc., a central processing unit (CPU) 44, an image editing section 45, and interfaces 46 and 47.

The image data input section 40 includes the three-line color CCD 40a, a shading section 40b, a line matching section 40c, a sensor color correcting section 40d, an MTF correcting section 40e, and γ correcting section 40f. The color CCD 40a reads a monochromatic image or a color image and outputs image line data of separated color components of P (red), G (green), and B (blue). The shading section 40b makes correction of line image levels of the image line data which were read out by the color CCD 40a. The line matching section 40c is, for example, a line buffer which corrects an offset of the image line data which were read out by the color CCD 40a. The sensor color correcting section 40d makes correction of color data of the image line data of respective colors, which are outputted from the three-line color CCD 40a. The MTF correcting section 40e makes correction of signals of respective pixels so that the changes in these signals become more distinct. The γ correcting section 40f corrects brightness of an image to improve visual perception.

Further, the γ correcting section 40f has a plurality of γ input/output characteristic data (input/output characteristic values) for different documents, which can be selected and used depending on the document used.

The image processing section 41 includes a monochromatic data generating section 41a (monochromatic document), an input processing section 41b, an area separating section 41c, a black generating section 41d, a color correcting section 41e, a zoom processing section 41f, a spatial filter section 41g, and a half-tone processing section 41h. The monochromatic data generating section 41a generates monochromatic data (monochromatic document) from RGB signals, which are color image signals sent from the image data input section 40. The input processing section 41b converts the RGB signals into YMC signals which correspond to the laser beam scanners 42b through 42e making up recording sections, and also performs clock conversion. The area separating section 41c separates the input image data into a character area, a photographic dot area, and a photographic picture area. The black generating section 41d generates black by performing an underlying-color removing process based on the YMC signals outputted from the input processing section 41b. The color correcting section 41e adjusts respective colors of the color image signal based on respective color conversion tables. The zoom processing section 41f changes magnification of image information which was inputted based on a pre-set magnification. The half-tone processing section 41h is for expressing tones, such as multi-value error diffusion or multi-value dither.

The image data of respective colors which were subjected to the half-tone process are temporarily stored in the image memory 43. The image memory 43 includes four hard disks (rotary memory medium) 43a, 43b, 43c, and 43d which successively receive image data of 8-bit four colors (32 bits), which are serially outputted from the image processing section 41, and convert the received 32-bit data into 8-bit four-color image data with the use of a buffer to store and manage the converted image data as the image data of respective colors.

Further, in order to prevent offset colors due to different positions of the image forming stations Pa through Pd, the image data of respective colors are temporarily stored in a delay buffer memory 43e (semiconductor memory) of the image memory 43 so that the respective image data are outputted at different timings to match the timings of sending the respective image data to the laser beam scanners 42b through 42e.

The image data output section 42 includes a laser control unit 42a for performing pulse-width modulation based on the image data of respective colors from the half-tone processing section 41h, and the laser beam scanners 42b, 42c, 42d, and 42e of respective colors for performing laser recording based on pulse-width modulation signals according to the image signals of respective colors outputted from the laser control unit 42a.

The central processing unit (CPU) 44 is for controlling the image data input section 40, the image processing section 41, the image memory 43, the image data output section 42, and the image editing section 45 and the interfaces 46 and 47 (mentioned later) based on a predetermined sequence. The image editing section 45 is provided to perform predetermined image editing on the image data which are temporarily stored in the image memory 43 via the image data input section 40, the image processing section 41, or the interfaces (mentioned later). The editing operation of the image data is carried out using an image synthesizing memory (not shown).

Further, the interface 46 is communication interface means for receiving image data from an external image input processing device, such as a communication portable terminal, digital camera, or digital video camera, which is separately provided from the digital color copying machine 1, via wireless communication such as IR.

Note that, the image data inputted into the interface 46 is also stored in and managed by the hard disks 43a, 43b, 43c, and 43d by once inputting it into the image processing section 41 to perform a color spatial correction thereon, so as to convert it into a data level which can be processed by the image data output section 42 of the digital copying machine 1.

Further, the interface 47 is a printer interface for receiving image data created by a personal computer (not shown), as well as a monochromatic or color FAX interface for receiving faxed image data. The image data inputted into the interface 47 are already in the form of CMYK signals, and are stored and managed by the hard disks 43a, 43b, 43c, and 43d of the image memory 43 via the half-tone processing section 41h.

The following explains a control structure of the entire digital color copying machine 1.

Figure 4:
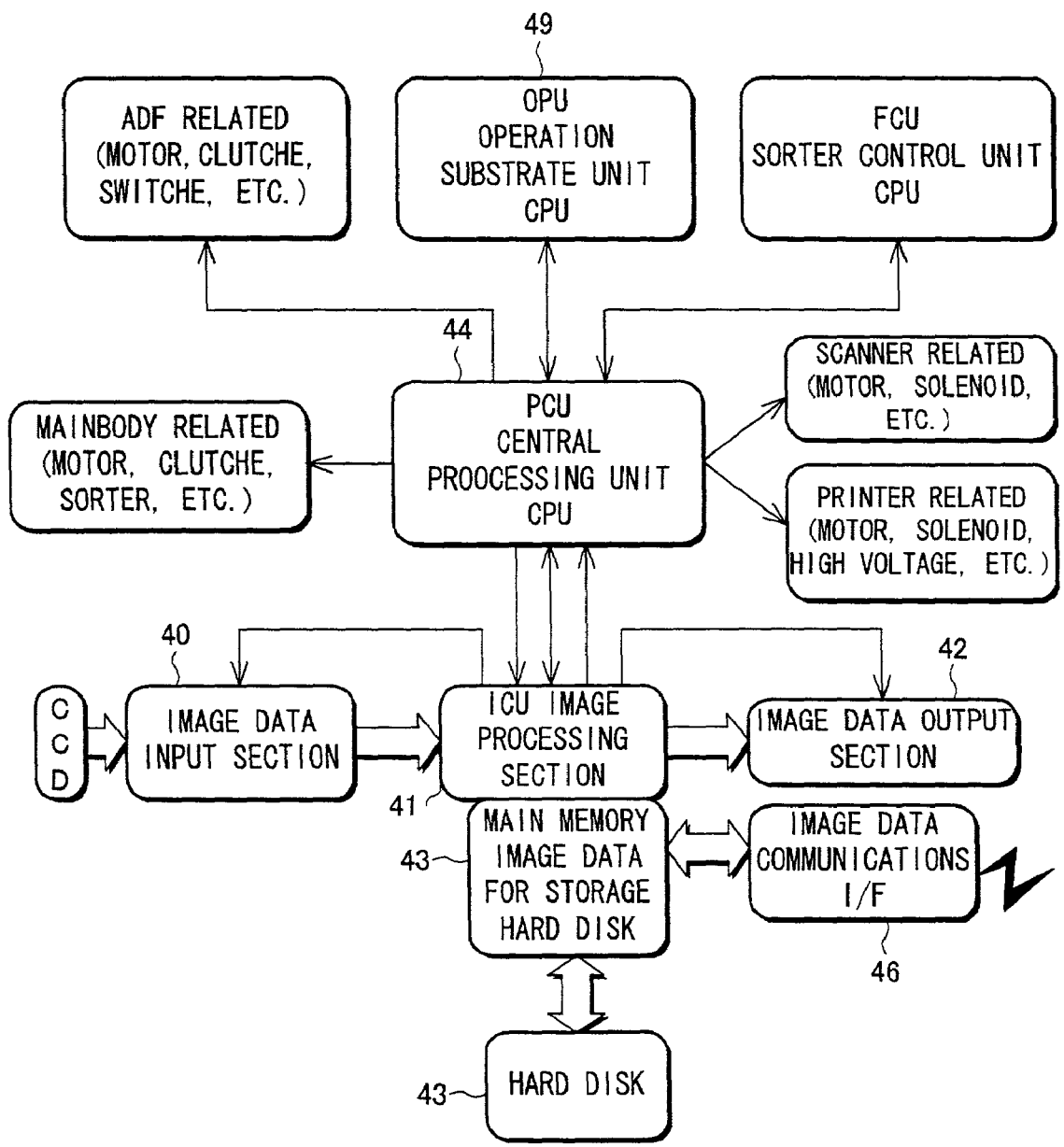
FIG. 4 is a block diagram showing mutuality of various components of the image forming apparatus.

FIG. 4 is a block diagram showing a state where operations of various components making up the entire device of the digital color copying machine 1 are controlled by the central processing unit (CPU) 44. Details of the image data input section 40, the image data processing section 41, the image memory 43, the image data output section 42, and central processing unit (CPU) 44 are as described above with reference to FIG. 3, and explanations thereof are omitted here.

The central processing unit 44 also manages driving mechanism sections, such as the RADF, a scanner section, and a laser printer section, making up the digital color copying machine 1, and outputs control signals to these sections. Further, the central processing unit 44 is connected to an operation substrate unit 49 made up of an operation panel to allow bi-directional communications, so that a control signal indicative of the content of a copy mode, which is set by the operation of the operation panel by the user, is transferred to the central processing unit 44. The central processing unit 44, by the input of the control signal, controls the digital color copying machine 1 entirely to operate it according to the copy mode set by the user.

Further, the central processing unit 44 transfers control signals, which indicate various operation states of the digital color copying machine 1, to the operation substrate unit 49 so as to allow the user on the side of the operation substrate unit 49 to know the current state of the device by the control signals via display of the operation states on a display section, for example.

The following describes the operation panel.

Figure 5:
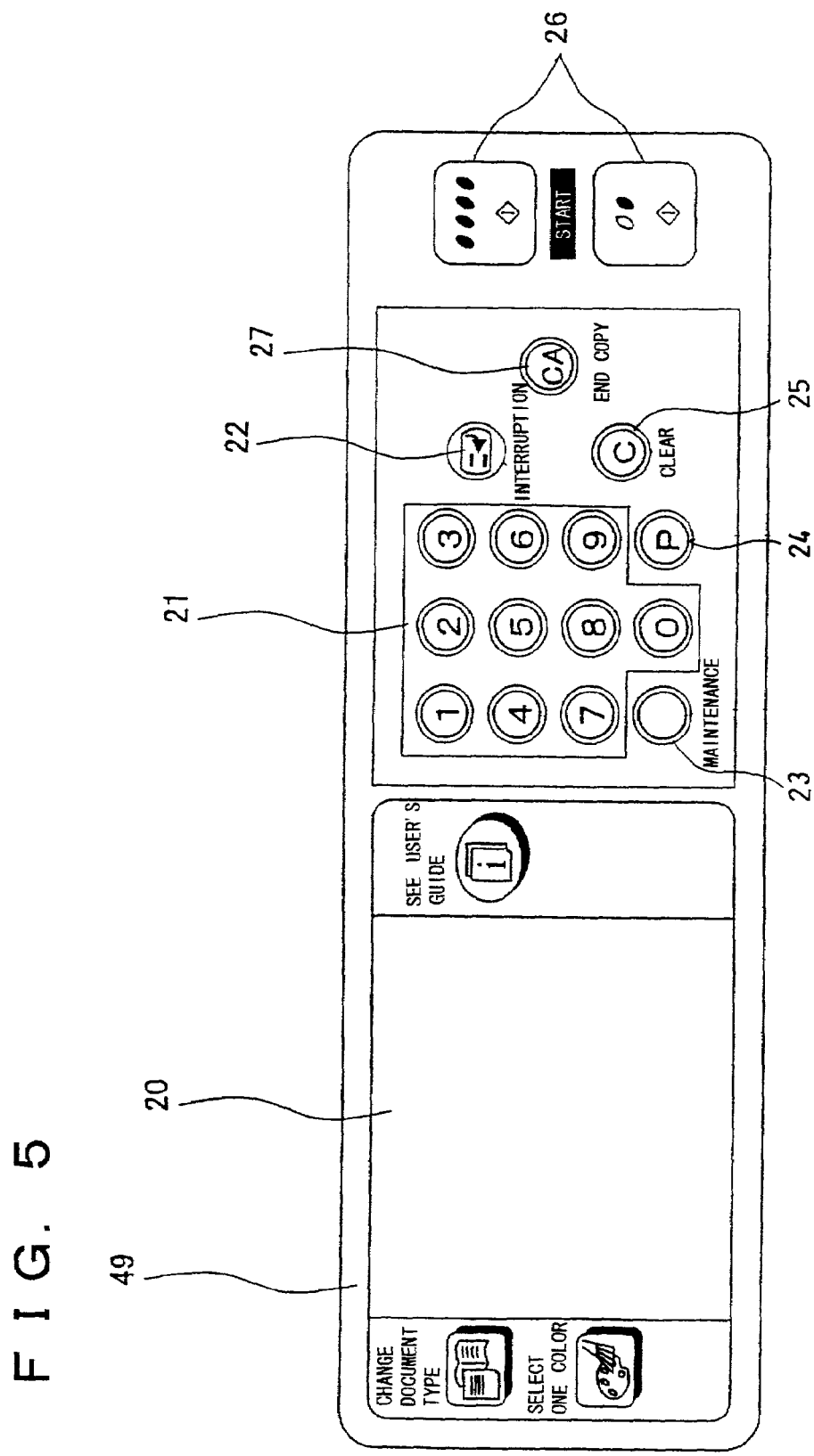
FIG. 5 is a plane view schematically showing an operation panel of the image forming apparatus.

FIG. 5 shows the operation substrate unit 49 of the operation panel of the digital color copying machine 1. On the left side of the operation substrate unit 49 of the operation panel is provided a touch-panel liquid crystal display device 20 of color display ("color LCD" hereinafter), and on the right side thereof are disposed a ten key 21, start keys 26, a clear key 25, an interruption key 22, and an all-clear key 27.

The color LCD 20 is switched to display various screens, as will be described later. These screens have touch keys for setting various conditions, allowing such conditions to be set by directly pushing the touch keys with a finger.

The color LCD 20 also displays operation guidance or warnings. Among the key group on the right side of the color LCD 20, the ten key 21 is used to make entry of numerical values on the screen of the color LCD 20. The start keys 26 are for instructing a start of copying operations. The upper start key 26 is used when forming a color image, and the lower start key 26 is used when forming a monochromatic image.

The clear key 25 is used to clear set values displayed on the color LCD 20, or to stop the copying operations. The all-clear key 27 is used to reset copying conditions to default values. The interruption key 22 is to interrupt undergoing copying to allow another copying.

The following describes an image processing method of the image forming apparatus.

The image forming apparatus in accordance with the present invention includes a plurality of image forming modes, depending on types of documents of different image quality (original document such as an ordinary print or a photograph, or a copy which has been copied at least once).

Figure 6:
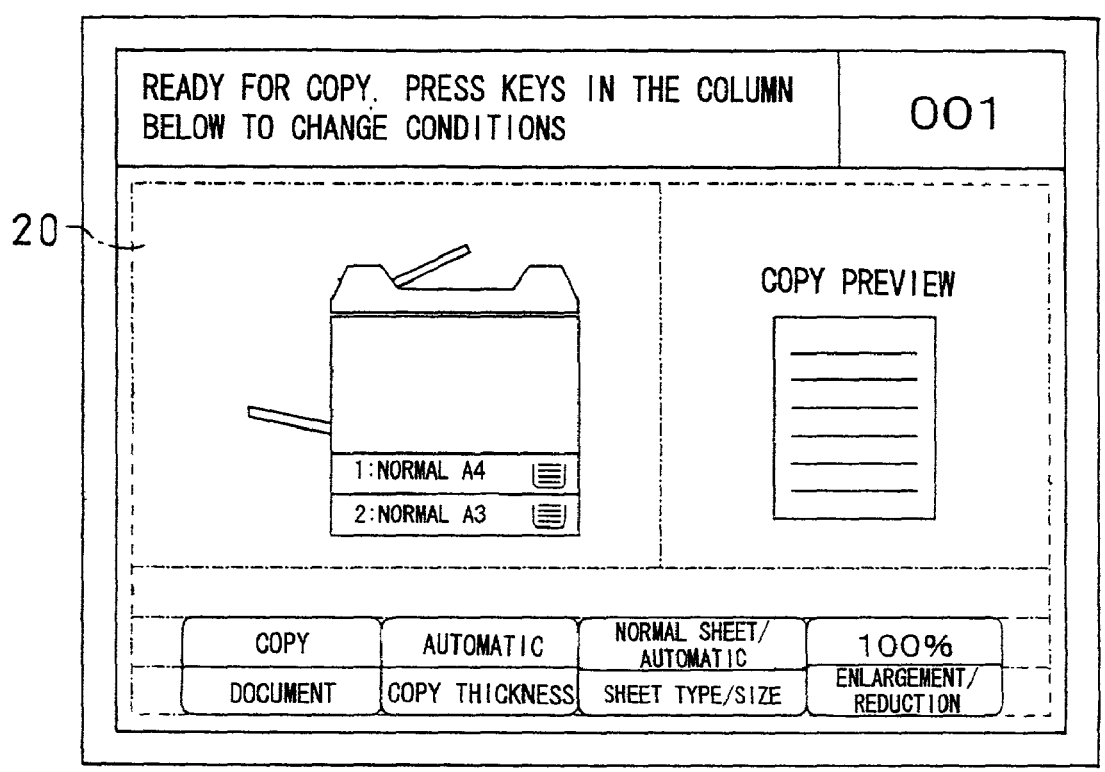
FIG. 6 is an explanatory drawing showing an example of a display screen of a color LCD of the operation panel.

These image forming modes can be switched by selecting the types of documents using a condition key on the color LCD 20 of the operation panel. The screen of the color LCD 20 of the operation panel as shown in FIG. 6 illustrates a state where a copied document is selected.

The original document can be selected by pressing the condition key. That is, "COPY" and "ORIGINAL" are displayed alternately every time the condition key "DOCUMENT" is pressed, thus switching the image forming modes according to the displayed content.

The image forming modes are switched by switching input/output (I/O)characteristic tables, and, for example, γ characteristic ① is selected in the case of the original document, and γ characteristic ② is selected in the case of a copied document.

Figure 7:
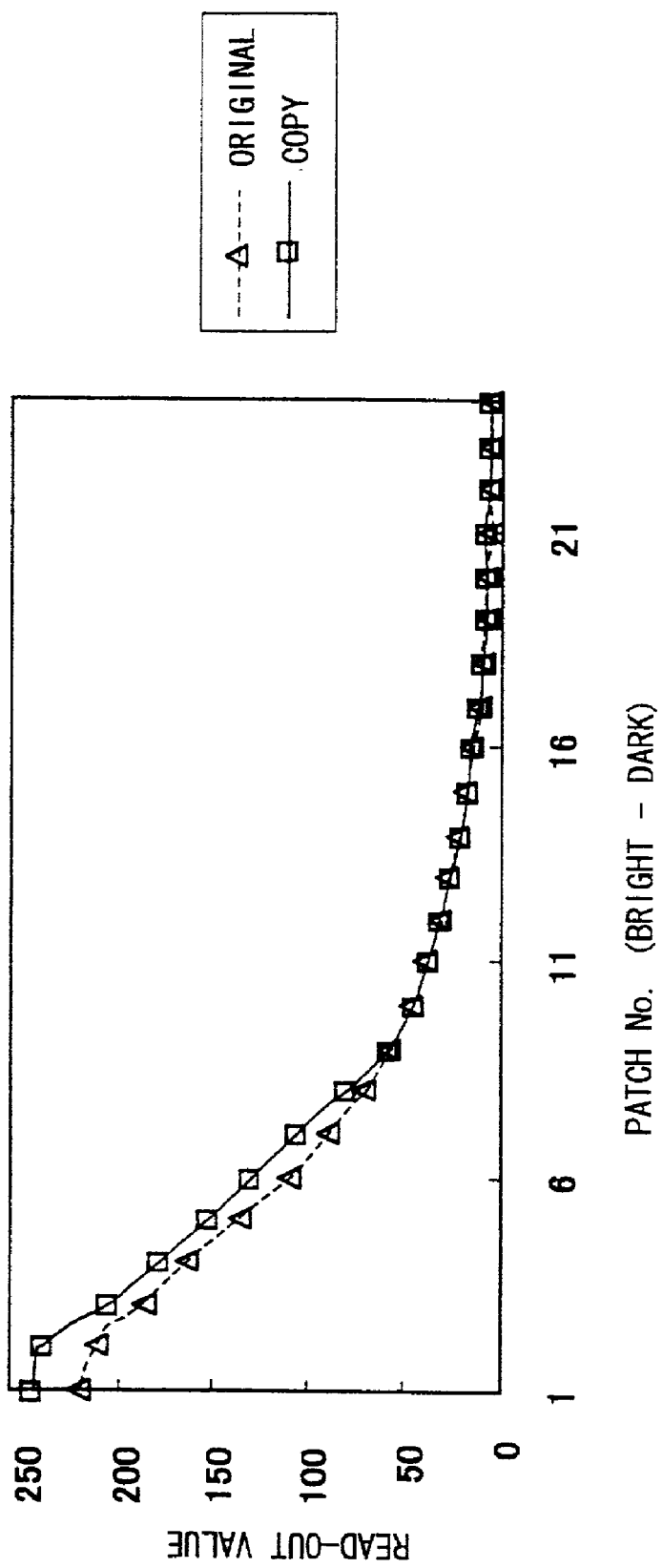
FIG. 7 is a graph showing how read-out data differ between an original document and a copy of the original document in the image forming apparatus.

This is because, in reading the original document and a copy of the original document (duplicate document), they come to have different read-out values at a portion of high brightness (in particular, a highlight portion) as shown in FIG. 7, and the copy of the original document will have a brighter value in the highlight portion than the original document.

Therefore, in such an image forming apparatus, copying without any image process results in change in not only brightness but also color in forming color images, posing the problem of deteriorative color change in copy to copy of a document.

In view of this drawback, conventionally, image forming apparatuses were usually adjusted to set a pre-set I/O characteristic table (e.g., γ characteristic ①, or γ characteristic ②) of each type of a document, which is set for individual apparatuses and differs from apparatus to apparatus, in the assemble line of a factory, or when installing the image forming apparatuses for use. Such a procedure is troublesome and posed a problem conventionally.

On the other hand, in order to overcome this problem, the present invention is adapted to prevent a large color change even when copy-to-copy was repeated, by selecting the I/O characteristic table, such as the γ characteristic, depending on whether the document is an original or a copy, which is effected by reading the reference document once.

The following explains in more detail how the I/O characteristic tables are set in the image forming apparatus and the image processing method in accordance with the present invention. In the present invention, to set the I/O characteristic tables, the image forming apparatus is set in an I/O characteristic table setting mode, and by reading a reference document 2 as shown in FIG. 8 by the image data input section 40, the γ characteristic ① and the γ characteristic ② are set simultaneously.

Figure 9:
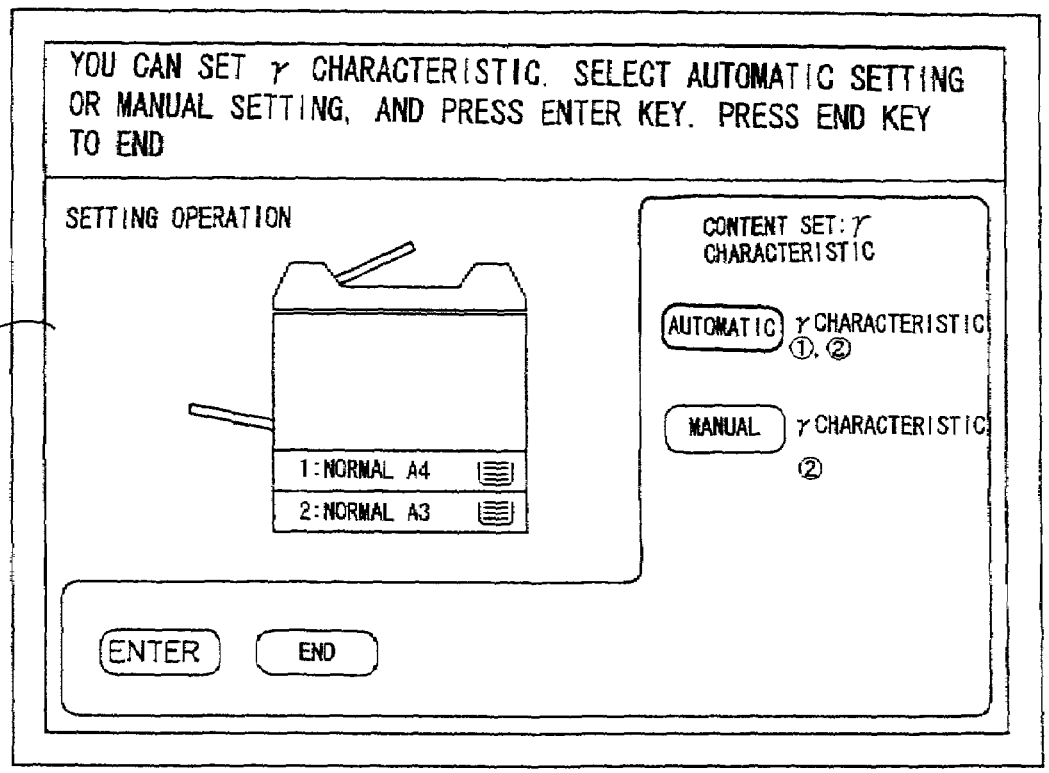
FIG. 9 is an explanatory drawing showing an example of an initial display screen for setting γ characteristic on the color LCD.

First, operating on the operation panel, the image forming apparatus is set in the I/O characteristic table setting mode by pressing the upper start key 26, after key entry, for example, on the ten key 21 in a predetermined sequence. When the I/O characteristic table setting mode is set, the screen as shown in FIG. 9 is displayed on the color LCD 20 of the operation panel.

The set mode "AUTOMATIC" is for a shorter operation time in which both γ characteristic ① and γ characteristic ② are set by reading the reference document once, and the "MANUAL" mode allows the user to set only the γ characteristic ② as desired, allowing fine tuning.

Figure 1:
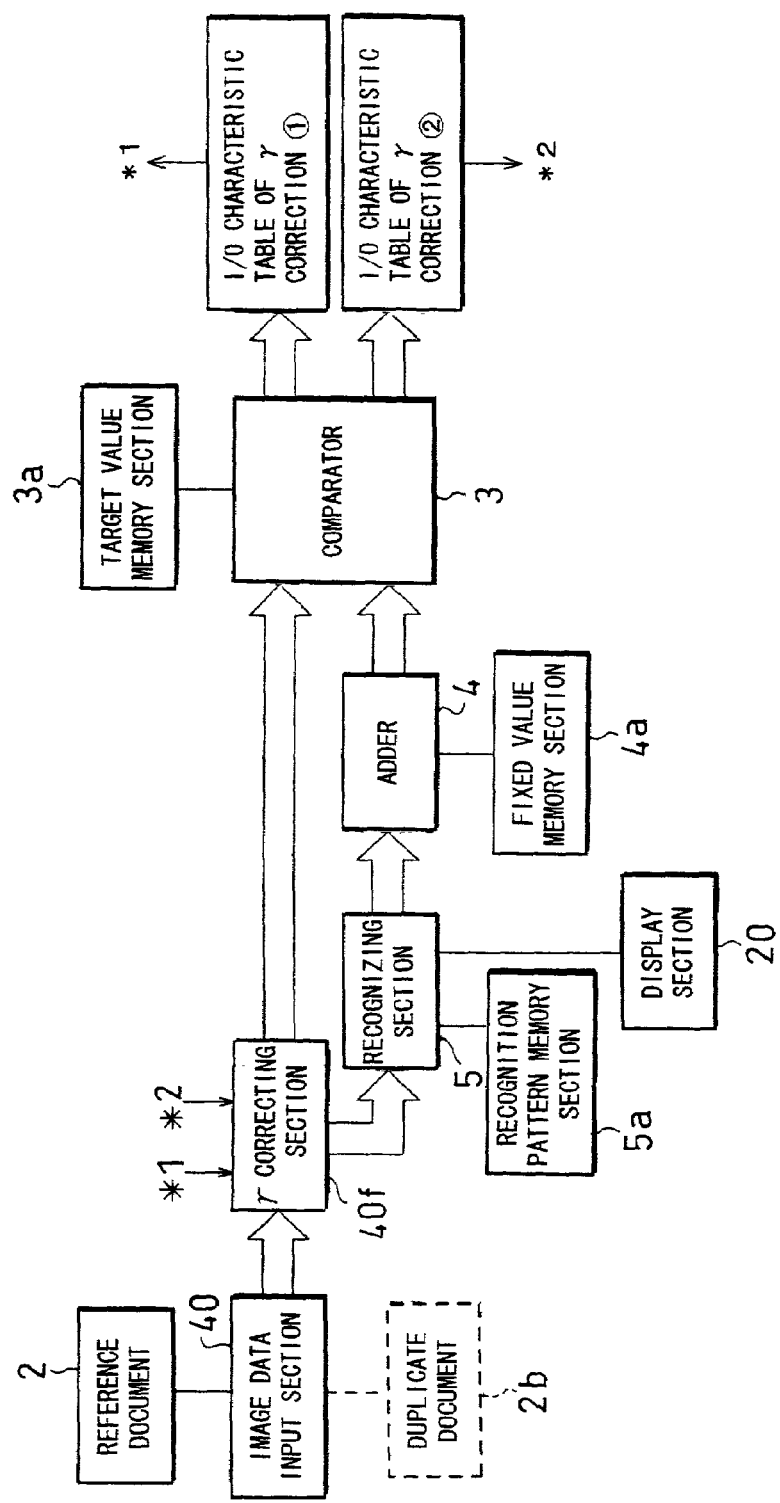
FIG. 1 is a block diagram showing a main portion of an image forming apparatus of the present invention.
Figure 8:
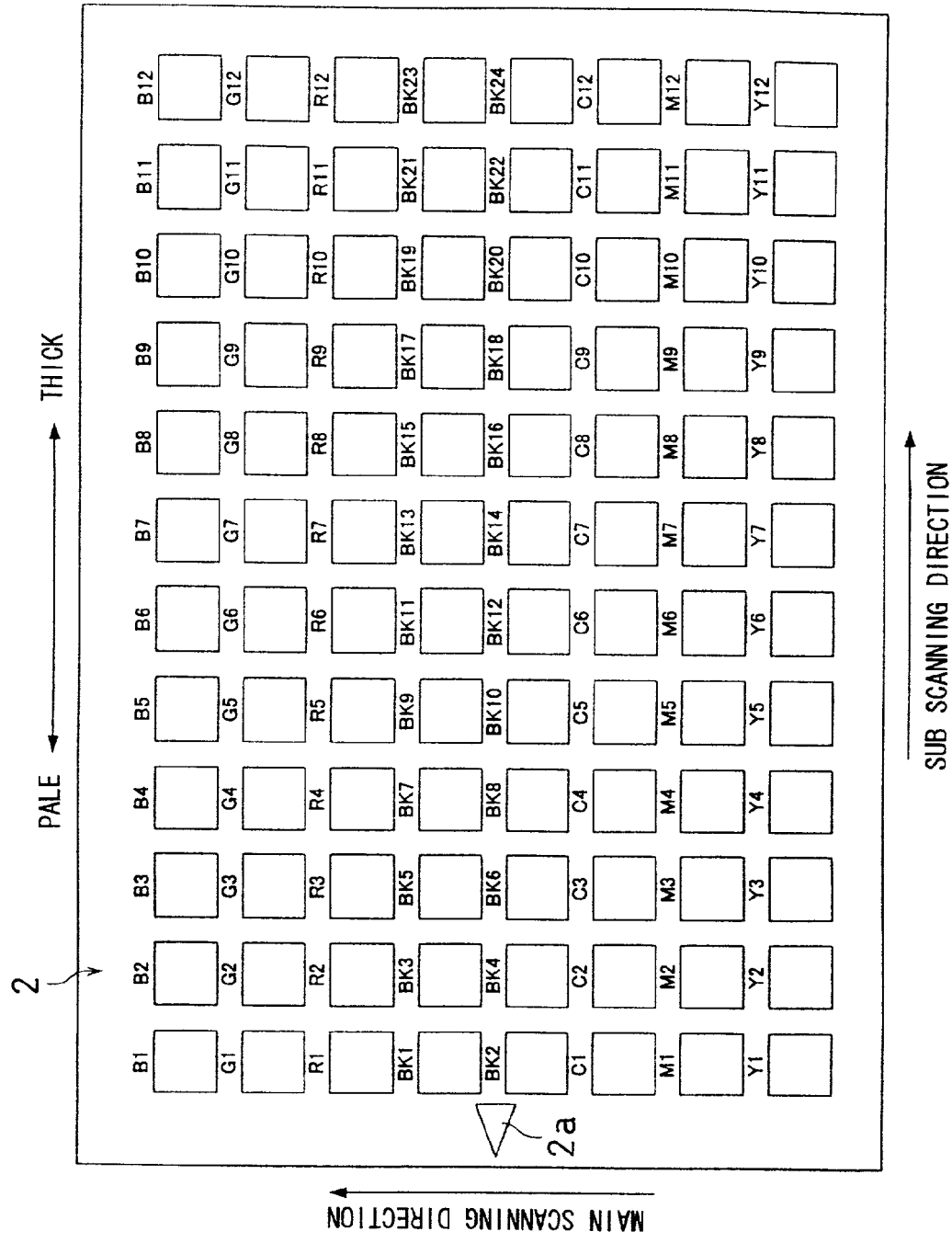
FIG. 8 is an explanatory drawing showing a reference document used in the image forming apparatus.
Figure 10:
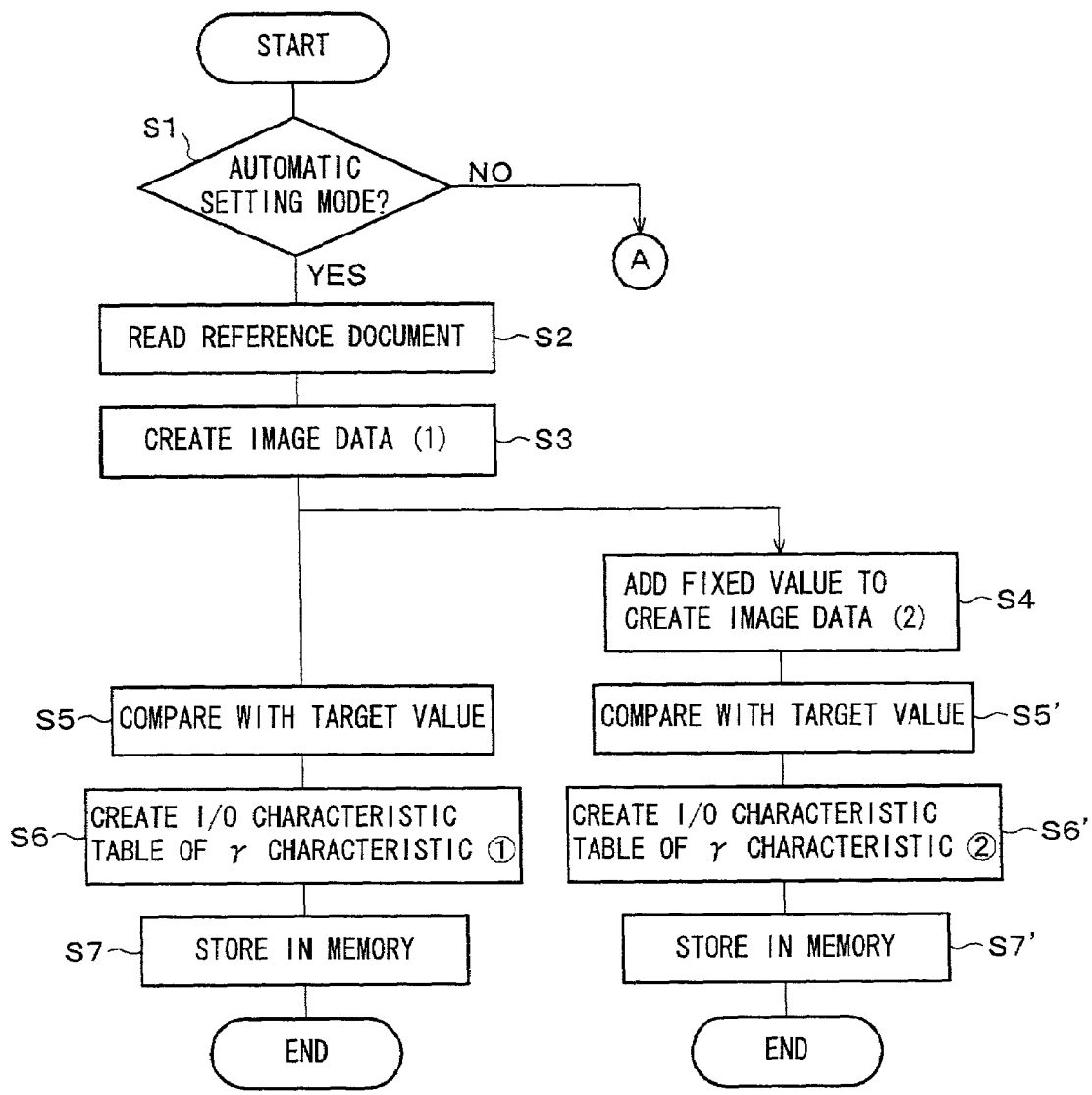
FIG. 10 is a flow chart illustrating an image processing method of the image forming apparatus.

The following explains the automatic setting mode with reference to FIG. 1, which is a block diagram, FIG. 8, which is an explanatory drawing showing the reference document, and FIG. 10, which is a flow chart. In step 1 ("step" will be abbreviated to "S" hereinafter), "AUTOMATIC" is selected on the display screen of the color LCD 20 of the operation panel, and the reference document 2 as shown in FIG. 8 is placed on the document table 111 of the image data input section 40 so that a triangle mark 2a points a document reference of the document table 111, and the upper start key 26, which is a color start key, on the operation panel is pressed. The image data input section 40 starts to read reference patches of the reference document 2 (S2), and image data (1) is created, for example, based on the I/O characteristic value (referred to as "I/O characteristic table" hereinafter), which is the γ characteristic, in the γ correcting section 40f (S3).

The image data (1) thus created is compared in a comparator (first setting means) 3 with a target value corresponding to the reference document 2, which is stored beforehand in a target value memory section 3a (S5), and an I/O characteristic table of the γ characteristic ① is newly created (S6) and is stored in a memory, which is not shown here (S7). Here, the newly created I/O characteristic table of the γ characteristic ① may be replaced with the previous I/O characteristic table, which is stored, for example, in the γ correcting section 40f.

Meanwhile, with respect to the image data (1) which was created by reading the reference document 2, an adder (first setting means) 4 adds a fixed value which is stored beforehand in a fixed value memory section 4a (image data (1) is compensated) to create another image data (2) (S4). The image data (2) thus created is then compared with the target value which was used to create the γ characteristic ① (S5'), and simultaneously, an I/O characteristic table of the γ characteristic ② is created (S6'), and the I/O characteristic table of the γ characteristic ②, which is different from that of the γ characteristic ①, is stored in a memory (S7'). Here, the newly created I/O characteristic table of the γ characteristic ② may be replaced with the previous I/O characteristic table, which is stored, for example, in the γ correcting section 40f.

Note that, the foregoing explained the case where the γ correcting section 40f was adopted as an example of the I/O characteristic table, but the same principle applies also to various parameters which are used for image processing in other parts of the image forming apparatus. Also, the image data (2) can be regarded as pseudo image data which is obtained, for example, by reading a reference document for a duplicate document by the image data input section 40.

More specifically, the reference document as shown in FIG. 8 has tone patterns of plural colors (R, G, B, C, M, Y, K), each color having 12 color patches, and 24 patterns are formed for the tone patterns of monochromatic colors (white to black). The image data input section 40 reads the reference document 2 by reading 24 patterns of K (monochromatic color), and component data of each color, having patch No. (BK1 through BK 24), as shown in FIG. 11 are created.

That is, there are created RXi (RX1 to RX24) of an R component, GXi (GX1 to GX24) of a G component, and BXi (BX1 to BX24) of a B component. The pre-stored target value is also provided for each component: RRi (RR1 to RR24) of an R component, GRi (GR1 to GR24) of a G component, and BRi (BR1 to BR24) of a B component.

Further, the image data (2) is the predicted value of reading a duplicate document 2b of the reference document 2, and includes RX'i (RX'1 to RX'24) of an R component, GX'i (GX'1 to GX'24) of a G component, and BX'1 (BX'1 to BX'24) of a B component, which are determined by addition, as shown below, of a fixed value including RCi (RC1 to RC24) of an R component, GCi (GC1 to GC24) of a G component, and BCi (BC1 to BC24) of a B component, which have been determined, for example, by experiment.

$$\begin{pmatrix} RXi \\ GXi \\ BXi \end{pmatrix} + \begin{pmatrix} RCi \\ GCi \\ BCi \end{pmatrix} = \begin{pmatrix} RX'i \\ GX'i \\ BX'i \end{pmatrix}$$

In the comparator 3, the (RXi, GXi, BXi) generated from the reference document 2, and the calculated (RX'i, GX'i, BX'i) are independently compared with the (RRi, GRi, BRi), thus creating new γ characteristic ① and new γ characteristic ② in the image forming apparatus.

Figure 13:
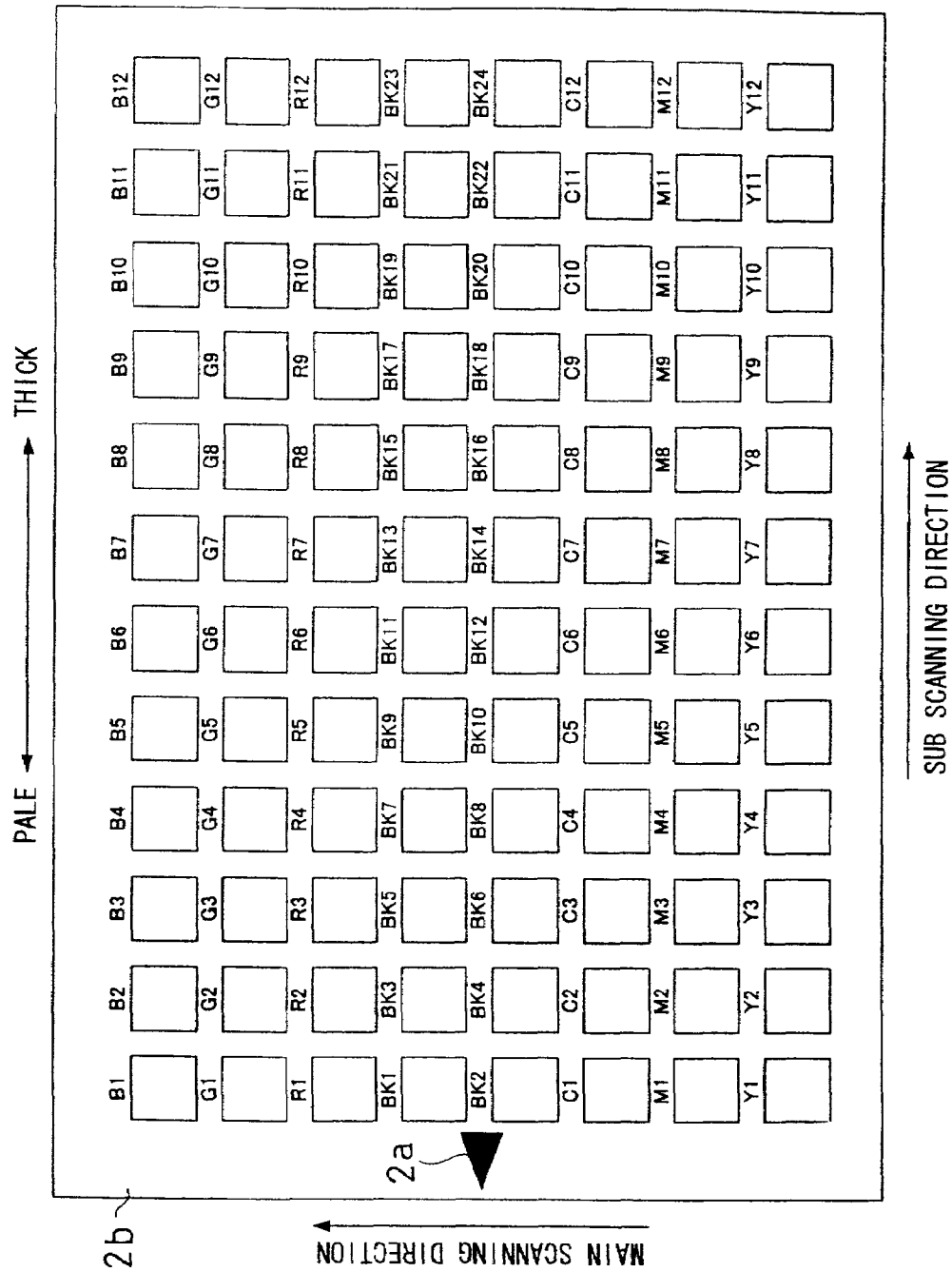
FIG. 13 is an explanatory drawing showing a duplicate document which is obtained from the reference document used in the image forming apparatus.
Figure 14:
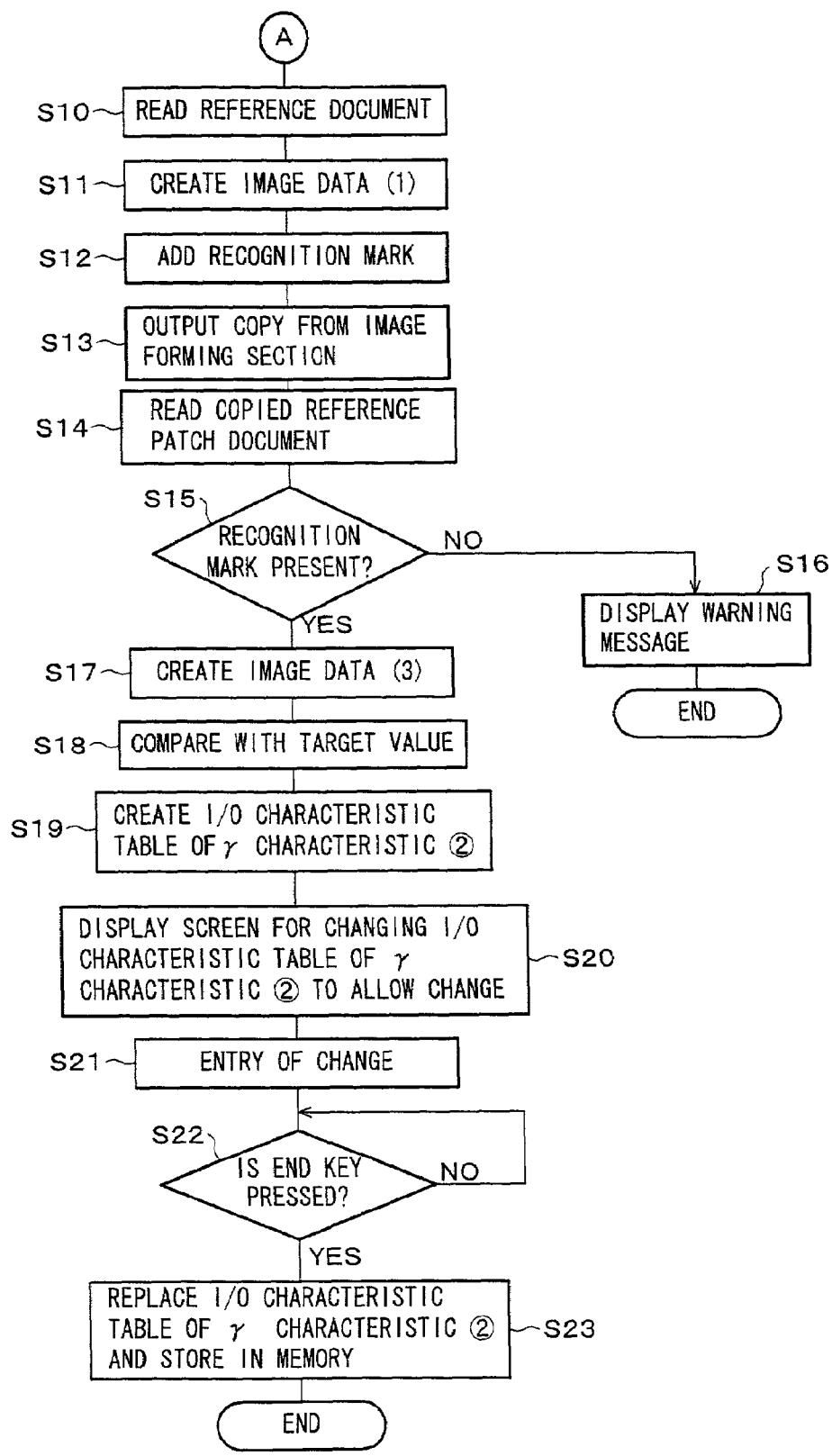
FIG. 14 is a flow chart showing another image processing method of the image forming apparatus.

The following describes the manual setting mode with reference to FIG. 1, FIG. 10, FIG. 12, FIG. 13, and FIG. 14. As shown in FIG. 10, when the manual mode is selected on the operation panel (S1), in the manual setting mode as shown in FIG. 14, the reference document 2 is read (S10), and the image data (1) is created (S11), and an image is formed from the image data (1) in the image data output section 42 based on the pre-set I/O characteristic table (γ characteristic ①), so as to create the duplicate document 2b of the reference document 2.

Here, the duplicate document 2b is created by adding a new image (recognition mark), which the reference document 2 does not have, on the reference document 2 by an image process (S12, S13). In the present embodiment, this is carried out by filling in the triangle mark 2a at a front end of the reference document 2 as shown in FIG. 13; however, not limiting to this, a new character or pattern may be added to a predetermined portion.

Consequently, the duplicate document 2b, which is a copy of the reference document 2 created, is placed on the document table 111 of the image data input section 40, with the filled triangle mark 2a pointing a document setting standard point, so as to carry out reading again (S14).

In the case where the recognizing section 5 fails to recognize the filled triangle mark 2a in the reading operation based on the recognition pattern which is stored beforehand in the recognition pattern memory section 5a (S15), the document being used is judged to be incorrect, so as to interrupt and end the setting procedure by displaying a warning message (e.g., "USE A CORRECT COPY OF THE DUPLICATE DOCUMENT) on the display section of the color LCD 20 on the operation panel (S16). In this case, the user selects whether to execute the procedure again or end it.

On the other hand, when the recognizing section 5 detects the filled triangle mark 2a in the reading operation (S15), the duplicate document 2b is judged to be a correct copy for the manual setting, and image data (3) is created (S17) and sent to the comparator 3 upon reading.

Here, according to instructions of the central processing unit (second setting means) 44, the adder 4 directly sends the image data (3) to the comparator 3 without performing addition (i.e., image data (3) corresponds to the pseudo image data). Then, the image data (3) is compared in the comparator 3 with the target value which was used to create the γ characteristic ① (S18), and a new I/O characteristic table of the γ characteristic ② is created (S19), which is then displayed on the operation panel (S20).

Further, the manual setting mode allows the setting of the γ characteristic ② to be changed, after it is set, by directly operating on the operation panel. FIG. 12 shows a screen for directly changing the γ characteristic ② in the manual setting mode. In the manual setting mode, the RGB key is used to select each color component for individual display, and the patch No. is chosen by the right and left arrow keys, and the up and down arrow keys are used to adjust the value on the selected adjustment point, and the characteristic value is decided by the enter key. In FIG. 12, patch No. 10 is selected (S21).

The setting is finished by operating the end key (S22), and after the key entry of the end key, the I/O characteristic table of the new γ characteristic ② thus changed and adjusted is written over the previously stored I/O characteristic table of the γ characteristic ② (S23).

In this manner, the present invention can set the I/O characteristic table of an ordinary original document and the I/O characteristic table of a document which has been copied at least once, simultaneously in the image forming apparatus by reading the reference document 2 once. This simplifies the procedure of setting the I/O characteristic tables, which is carried out in individual image forming apparatuses when adjusting them in the assemble line of a factory, or when installing them for use, thus greatly reducing time required for adjusting the apparatuses.

Further, in view of the conventional problem where a large color difference is caused in copy-to-copy of the original document (copying duplicates), the present invention provides an additional I/O characteristic table for copy-to-copy, thus obtaining copies, even copies of duplicates, which are not much different from the original copy.

Further, in the present invention, the I/O characteristic table for copy-to-copy can be adjusted independently, thus setting the I/O characteristic table of the image forming apparatus in a mode which allows free adjustment according to the user's preference or copies made by a different image forming apparatus.

As described, the image forming apparatus of the present invention having a plurality of image forming modes includes an image reading section for reading a document; an image forming section for forming an image based on image data of the document read; and first setting means for setting respective input/output characteristic values corresponding to the plurality of image forming modes based on reference image data generated by reading a reference document having a tone pattern formed thereon.

This arrangement allows the respective input/output characteristic values corresponding to the plurality of image forming modes to be simultaneously set by reading the reference document once, without a procedure of setting the input/output characteristic values for a number of times which correspond to the number of the plurality of image forming modes, thus greatly reducing time for the procedure of setting the respective input/output characteristic values, in addition to reducing adjustment cost.

Further, the image forming apparatus may have an arrangement wherein: the plurality of image forming modes include a first image forming mode for forming an image by reading an ordinary document, and a second image forming mode for forming an image by reading a duplicate document which was copied in the image forming section, and the first setting means sets a first input/output characteristic value, which is used in the first image forming mode, and a second input/output characteristic value, which is used in the second image forming mode, by reading the reference document in the image reading section.

With this arrangement, the respective input/output characteristic values corresponding to an ordinary document and a copied document can be set in a shorter period of time by simply reading the reference document once, with the result that a good copy of the original document, not much different from the original, can be obtained not only in image formation of an ordinary document but also a copied document which has been copied at least once.

It is preferable in the foregoing image forming apparatus that the first setting means creates the first input/output characteristic value by comparing first reference image data, which was created by reading the reference document in the image reading section, and a pre-stored target value, and creates the second input/output characteristic value by comparing the target value and second reference image data, which is compensated data of the first image data, using a pre-stored fixed value which corresponds to a difference in the respective input/output characteristic values.

According to this arrangement, the second input/output characteristic value is set by comparing second reference image data, which is obtained by compensating the first reference image data by the fixed value, and the target value which was used to determine the first input/output characteristic value.

Thus, this arrangement allows both the first input/output characteristic value and the second input/output characteristic value to be set simultaneously based on the first reference image data which was obtained by reading the reference document only once, thereby setting the respective input/output characteristic values in a shorter period of time.

Further, in the foregoing arrangement, since the second input/output characteristic value is set using the target value which was used to determine the first input/output characteristic value, the second input/output characteristic value can be set faster and more easily. Thus, with this arrangement, the input/output characteristic values can be created easily and instantly, thus setting the input/output characteristic values both accurately and automatically.

The image forming apparatus may further include: second setting means for outputting the reference image data of the reference document having the tone pattern formed thereon, which was read by the image reading section, to the image forming section based on the first input/output characteristic value, and setting the second input/output characteristic value based on a duplicate reference document, which is a copy of the reference document made by the image forming section.

With this arrangement, since the second input/output characteristic value is set using a duplicate reference document which was created by the image forming section based on the reference document, the resulting second input/output characteristic value corresponds to the copied document actually used, thus setting the second input/output characteristic value which is used in the second image mode further accurately.

The image forming apparatus may further include: an operating section, which is adapted to adjust the second input/output characteristic value when setting the second input/output characteristic value, which is used in the second image forming mode.

This arrangement allows the user to set the second input/output characteristic value as desired, through the operating section in the second image forming mode for forming an image of a copied document, thus setting the second input/output characteristic value which can reproduce, for example, a desired color, in forming an image of a copied document, i.e., in copy-to-copy.

The image forming apparatus may further include: detecting means for detecting a pattern indicative of setting the second input/output characteristic value formed on the reference document; and second setting means for setting the second input/output characteristic value when the pattern is detected.

According to this arrangement, the detecting means automatically detects whether or not the document to be read is, for example, a copied reference document, which detection is required in a reading operation, thus preventing erroneous setting due to incorrect use of a document (e.g., using original reference document) in setting the second input/output characteristic value.

The image forming apparatus may further include: adding means for adding the pattern on the duplicate reference document for re-reading, which was created by the image forming section by reading the reference document in the image reading section, so as to output the duplicate reference document with the pattern, when setting the second input/output characteristic value, which is used in the second image forming mode.

According to this arrangement, by adding a pattern to a duplicate reference document, the duplicate reference document can be clearly distinguished from the original reference document, thus avoiding erroneous setting which is inflicted by using the original document when the duplicate reference document is to be used, in addition to ensuring the setting procedure and preventing a delay in the setting procedure.

It is preferable in the foregoing image forming apparatus that the adding means adds the pattern on a front end portion in a transport direction of the duplicate reference document for re-reading.

According to this arrangement, since the pattern, which is provided to set the second input/output characteristic value, is formed on the front end portion of the reference document having tone patches and the like thereon, it is possible to easily judge whether the document is a duplicate reference document or not. Therefore, this arrangement allows judgement as to whether or not the document is a duplicate reference document, which was read again to set the second input/output characteristic value, prior to an image process intended for setting the document read, thus ensuring prevention of erroneous setting of a reference document for the setting procedure.

The image forming apparatus may further include prohibiting means for prohibiting setting the second input/output characteristic value when the pattern was not detected. With this arrangement, in the event where the reference document is incorrect, the operation of the setting process can be stopped immediately to inform the adjuster person, thus avoiding a delay in the setting procedure.

Further, the foregoing image forming apparatus may have an arrangement wherein the second setting means creates and sets the second input/output characteristic value by comparing third reference image data, which is obtained by reading the duplicate reference document by the image reading section, and the pre-stored target value.

According to this arrangement, the third reference image data which is obtained by reading the duplicate reference document is compared with the target value, which allows the second input/output characteristic value based on the third reference image data of the duplicate reference document actually used, thus setting the second input/output characteristic value with high accuracy.

The image processing method of the image forming apparatus of the present invention is for an image forming apparatus for forming an image in a plurality of image forming modes and having input/output characteristic values respectively corresponding to the plurality of image forming modes, and the method comprises the steps of: reading a reference document having a tone pattern formed thereon, as reference image data; setting a first input/output characteristic value, which corresponds to the first image forming mode, from a pre-set target value for setting an input/output characteristic value from the reference image data; and creating pseudo reference image data from the reference image data using a fixed value which corresponds to a difference in the respective input/output characteristic values, so as to set a second input/output characteristic value, which corresponds to a second image forming mode, from the pseudo reference image data and the pre-set target value.

According to this method, the pseudo reference image data, which corresponds to the second image forming mode, is created from the reference image data which corresponds to the first image forming mode. This allows the respective input/output characteristic values corresponding to the plurality of image forming modes to be simultaneously set by single reading of the reference document, without performing the procedure of setting the input/output characteristic values for a number of times which correspond to the number of the plurality of image forming modes, thus greatly reducing time for the setting procedure of the input/output characteristic values, in addition to reducing adjustment cost.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus for forming an image in a plurality of image forming modes, comprising:
    an image reading section for reading a document;
    an image forming section for forming an image based on image data of the document read; and
    first setting means for setting respective input/output characteristic values corresponding to the plurality of image forming modes based on reference image data generated by reading a reference document having a tone pattern formed thereon;
    wherein:
    said plurality of image forming modes include a first image forming mode for forming an image by reading an ordinary document, and a second image forming mode for forming an image by reading a duplicate document which was copied in said image forming section, and
    said first setting means sets a first input/output characteristic value, which is used in the first image forming mode, and a second input/output characteristic value, which is used in the second image forming mode, by reading the reference document in said image reading section.

2. The image forming apparatus as set forth in claim 1, wherein said first setting means creates the first input/output characteristic value by comparing first image data, which has been created by reading the reference document in said image reading section, and a pre-stored target value, and creates the second input/output characteristic value by comparing the target value, and second image data, which is compensated data of the first image data, using a pre-stored fixed value which corresponds to a difference in the respective input/output characteristic values.

3. The image forming apparatus as set forth in claim 1, further comprising:
    an operating section, which is adapted to adjust the second input/output characteristic value when setting the second input/output characteristic value, which is used in the second image forming mode.

4. The image forming apparatus as set forth in claim 1, further comprising:
    second setting means for outputting the reference image data to said image forming section based on the first input/output characteristic value, and setting the second input/output characteristic value based upon a duplicate reference document, which is a copy of the reference document made by said image forming section.

5. The image forming apparatus as set forth in claim 4, wherein said second setting means creates and sets the second input/output characteristic value by comparing third reference image data, which is obtained by reading the duplicate reference document by said image reading section, and the pre-stored target value.

6. The image forming apparatus as set forth in claim 4, comprising:

detecting means for detecting a pattern indicative of setting the second input/output characteristic value, formed on the reference document, wherein said second setting means sets the second input/output characteristic value when the pattern is detected.

7. The image forming apparatus as set forth in claim 6, comprising:

adding means for adding the pattern on the duplicate reference document for re-reading, which was created by the reference image data, to output the duplicate reference document with the pattern, when setting the second input/output characteristic value, which is used in the second image forming mode.

8. The image forming apparatus as set forth in claim 7, wherein said adding means adds the pattern on a front end portion in a transport direction of the duplicate reference document for re-reading.

9. The image forming apparatus as set forth in claim 6, comprising:

prohibiting means for prohibiting setting the second input/output characteristic value when the pattern was not detected.

10. An image processing method of an image processing apparatus for forming an image in a plurality of image forming modes and having input/output characteristic values respectively corresponding to the plurality of image forming modes, said method comprising the steps of:

reading a reference document having a tone pattern formed thereon, as reference image data;

setting a first input/output characteristic value, which corresponds to the first image forming mode, from a pre-set target value for setting an input/output characteristic value and from the reference image data; and creating pseudo reference image data from the reference image data using a fixed value which corresponds to a difference in the respective input/output characteristic values, so as to set a second input/output characteristic value, which corresponds to a second image forming mode, from the pseudo reference image data and the pre-set target value.

* * * * *